(12) United States Patent
Fasoli et al.

(10) Patent No.: US 8,757,484 B2
(45) Date of Patent: Jun. 24, 2014

(54) METHOD AND SYSTEM FOR REDUCING PERSONAL IDENTIFICATION NUMBER (PIN) FRAUD IN POINT OF SALE TRANSACTIONS

(75) Inventors: Jonathan David Fasoli, Aliso Viejo, CA (US); William Michael Dorsch, De Pere, WI (US); Joseph Hikmet Guzel, Palo Alto, CA (US); Nathaniel David Anderson, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 112 days.

(21) Appl. No.: 13/600,811

(22) Filed: Aug. 31, 2012

(65) Prior Publication Data

US 2014/0061298 A1    Mar. 6, 2014

(51) Int. Cl.
*G06K 5/00* (2006.01)

(52) U.S. Cl.
USPC .......................... 235/382; 235/379; 235/380

(58) Field of Classification Search
CPC ....................... G06Q 30/0267; G06Q 30/0601
USPC .......... 235/379, 380, 382; 705/1.1, 44, 35, 72
See application file for complete search history.

(56) References Cited

U.S. PATENT DOCUMENTS 8,358,278 B2 *    1/2013    Lim et al. .................. 345/173

* cited by examiner

*Primary Examiner* — Jamara Franklin
(74) *Attorney, Agent, or Firm* — Osha Liang LLP

(57) ABSTRACT

A method for personal identification number (PIN) fraud prevention, comprising: receiving, a request for a card-based financial transaction; prompting a customer for a PIN; receiving, from a scroll wheel corresponding to a plurality of digits, a first digit of the PIN, wherein the customer selects the first digit of the PIN by touching a touch sensitive region associated with the scroll wheel; receiving from the scroll wheel, a second digit of the PIN, wherein the customer selects the second digit of the PIN by touching the touch sensitive region, wherein the second digit is different than the first digit, and wherein touching the touch sensitive region to select the first digit and the second digit prevents fraud based on tracking PIN entry; and completing the card-based financial transaction.

20 Claims, 5 Drawing Sheets

US 8,757,484 B2

METHOD AND SYSTEM FOR REDUCING PERSONAL IDENTIFICATION NUMBER (PIN) FRAUD IN POINT OF SALE TRANSACTIONS

SUMMARY

In general, in one aspect, the invention relates to a method for personal identification number (PIN) fraud prevention. The method comprises: receiving, by a payment terminal, a request for a card-based financial transaction; prompting, by the payment terminal, a customer for a PIN; receiving, by the payment terminal and from a scroll wheel corresponding to a plurality of digits, a first digit of the PIN, wherein the customer selects the first digit of the PIN by touching a touch sensitive region associated with the scroll wheel; receiving, by the payment terminal and from the scroll wheel, a second digit of the PIN, wherein the customer selects the second digit of the PIN by touching the touch sensitive region, and wherein touching the touch sensitive region to select the first digit and the second digit prevents fraud based on tracking PIN entry; and completing, by the payment terminal, the card-based financial transaction.

In general, in one aspect, the invention relates to a non-transitory computer readable medium storing instructions for personal identification number (PIN) fraud prevention. The instructions comprising functionality to receive, using a payment terminal, a request for a card-based financial transaction; prompt, using the payment terminal, a customer for a PIN; receive, using the payment terminal and from a scroll wheel corresponding to a plurality of digits, a first digit of the PIN, wherein the customer selects the first digit of the PIN by touching a touch sensitive region associated with the scroll wheel; receive, using the payment terminal and from the scroll wheel, a second digit of the PIN, wherein the customer selects the second digit of the PIN by touching the touch sensitive region, and wherein touching the touch sensitive region to select the first digit and the second digit prevents fraud based on tracking PIN entry; and complete, using the payment terminal, the card-based financial transaction.

In general, in one aspect, the invention relates to a system for personal identification number (PIN) fraud prevention. The system comprises a scroll wheel corresponding to a plurality of digits; a touch sensitive region used to select, based on touching by a customer, a first digit of a PIN and a second digit of the PIN from the plurality of digits, wherein the PIN corresponds to an authorization code for the card of the customer, and wherein touching the touch sensitive region to select the first digit and the second digit prevents fraud based on tracking PIN entry; a processor; and a financial application executing on the processor, operatively connected to the scroll wheel, and configured to: receive a request for a card-based financial transaction; prompt the customer for the PIN; receive the PIN; and complete the card-based financial transaction.

Other aspects and advantages of the invention will be apparent from the following description and the appended claims.

DETAILED DESCRIPTION

Figure 1:
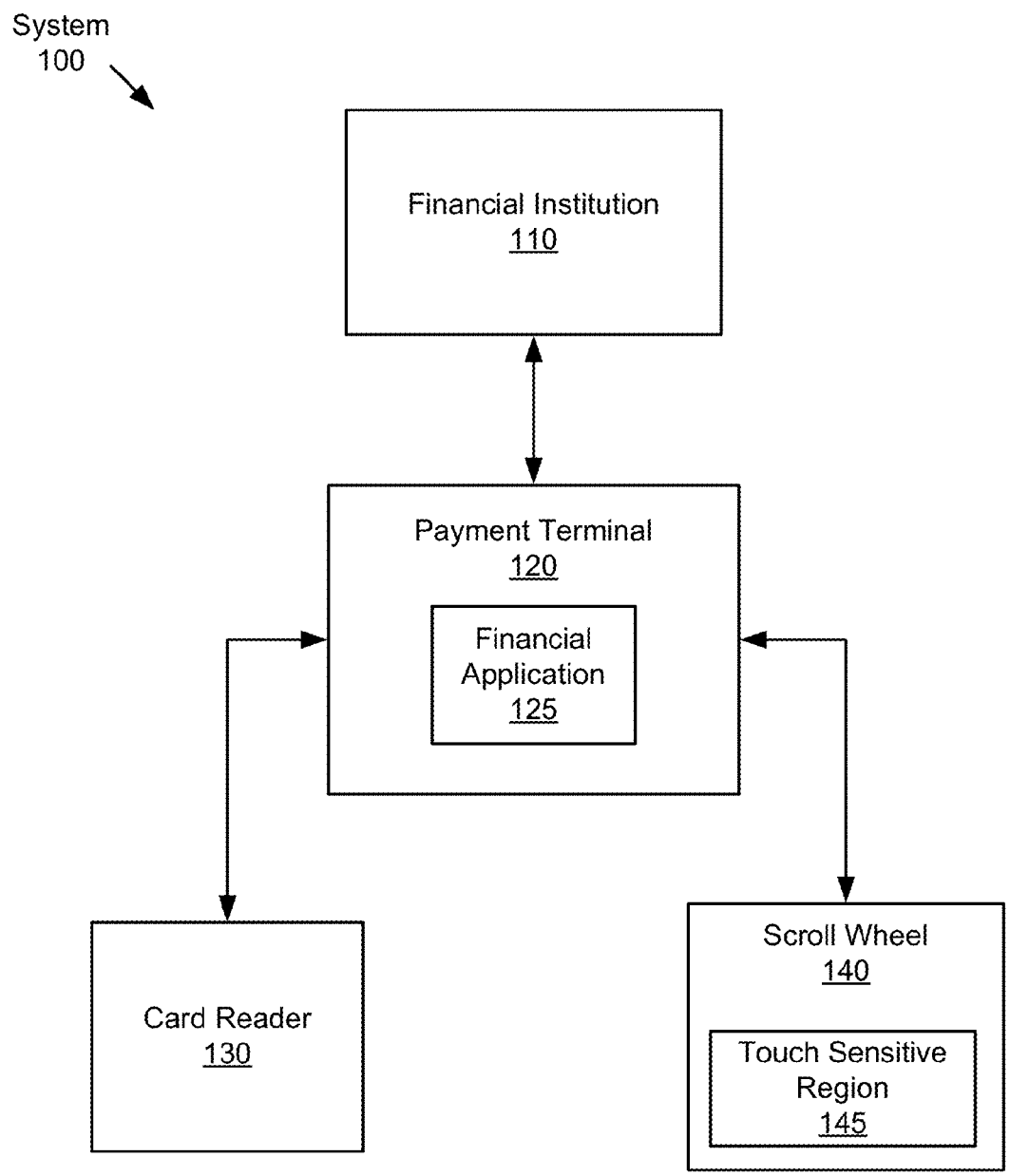
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Fraud prevention and security issues are extremely important concerns for all financial institutions and their customers. Some card-based transactions (e.g., a debit card transaction, credit card transaction, smart card, prepaid card transaction, etc) require the card-holder to provide a personal identification number (PIN) to a point-of-sale (POS) terminal in order to validate transaction authorization. Originally POS terminals were large, stationary devices that were only found at large retailers. As time went on, the cost of acquiring a POS terminal decreased, and smaller and smaller retailers began to have POS terminals. Now, virtually any device can be made into a POS terminal, such as a Smartphone. The decrease in cost of acquiring a POS terminal, and the increase in the amount and mobility of POS terminals has made fraud a much more prevalent problem than it used to be. While there are many ways to combat fraud, at least one element in preventing fraud and ensuring secure financial transactions includes protecting the secrecy and integrity of PINs.

In one or more embodiments of the invention, PINs are entered on a number pad/keypad of the POS terminal and may be compromised using various methods. If a PIN is compromised, then the owner of the card associated with the PIN, or the bank issuing the card, stands to lose potentially thousands of dollars, if not more. For example, in 2010, the total worldwide losses to credit and debit card fraud were approximately $7.6 billion. The risk of a PIN being compromised is only increasing as both the variety of attacks and volume of attacks increase. One approach includes spying on a card-holder as he or she enters a PIN. Another approach includes placing a fine film or other material which has a low likelihood of detection (e.g., barely visible) over the keypad and, after the customer leaves, subsequently looking at the imprints on the film to determine the keys selected by card-holder, and thus the PIN itself. Yet another approach includes using malicious software to intercept the PIN in its digital form. Due to these risks, there exists an increasing need to protect the secrecy of PINs as they are provided by card-holders at POS terminals.

In general, embodiments of the invention provide a method and system for personal identification number (PIN) fraud prevention. Specifically, a payment terminal receives a request for a card-based financial transaction and upon performing a transaction authorization request, determines that the user must authorize the transaction by providing their PIN and subsequently prompts the customer for a PIN. The PIN is received from a scroll wheel corresponding to multiple characters/digits, where the customer touches the same touch sensitive region to select multiple digits of the PIN. Once the full PIN is entered, the payment terminal subsequently completes the card-based financial transaction. By touching the same touch sensitive region to enter multiple characters/digits of the PIN, the likelihood of the PIN being compromised using the thin film method (discussed above) or any other fraud scheme is significantly reduced.

FIG. 1 shows System (100) in accordance with one or more embodiments of the invention. As shown in FIG. 1, System (100) includes Financial Institution (110), Payment Terminal (120), Financial Application (125), Card Reader (130), Scroll Wheel (140), and Touch Sensitive Region (145). The components of the system may be located on the same device (e.g., a server, mainframe, desktop Personal Computer (PC), laptop, Personal Digital Assistant (PDA), telephone, Smartphone, mobile phone, kiosk, cable box, and/or any other suitable device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

In one or more embodiments of the invention, Card Reader (130) is configured to obtain one or more card data items (e.g., card number, expiration date, security code(s), etc.) from a card (e.g., credit card, debit card, smart card, gift card, prepaid card, etc.) being used by a customer to make a purchase from a merchant. For example, Card Reader (130) may include a scanner for reading/retrieving the card data items from the magnetic strip of the card. As another example, Card Reader (130) may include a camera to photograph the card and extract the card data items from the resulting image. As yet another example, Card Reader (130) may include a key pad for the merchant and/or customer to input the card data items manually. Further still, in the case of some smart cards, Card Reader (130) may utilize radio frequency (RF) induction or Near Field Communication (NFC) to obtain the card data item(s) from the card.

In one or more embodiments of the invention, Scroll Wheel (140) corresponds to a displayed wheel. Accordingly, Scroll Wheel (140) may correspond to a computing device with a display screen (e.g., touch screen). The digits 0 to 9 may be present on the displayed wheel. There may exist a marker on or adjacent to the displayed wheel pointing to one of the digits. In one or more embodiments of the invention, the marker is stationary and the displayed wheel is rotated by a customer until the stationary marker points to a digit selected by the customer. In one or more embodiments of the invention, a default digit (e.g., 5) is initially displayed adjacent to the displayed wheel or on Payment Terminal (120). Rotating the displayed wheel increments or decrements the displayed digit. Accordingly, the customer may rotate the displayed wheel in either direction until the displayed digit corresponds to the desired digit. Once a desired digit is presented, a customer may choose to "lock" that digit by pressing an 'enter' or similar selection button that converts the displayed digit into a hidden character (usually an asterisk). Those skilled in the art, having the benefit of this detailed description, will appreciate that other types/formats of scroll wheels exist.

In one or more embodiments of the invention, Scroll Wheel (140) corresponds to a mechanical wheel. The digits 0 to 9 may be present on the mechanical wheel. There may exist a marker on or adjacent to the mechanical wheel pointing to one of the digits. In one or more embodiments of the invention, the marker is stationary and the mechanical wheel is rotated by a customer until the stationary marker points to a digit desired by the customer.

In one or more embodiments of the invention, Scroll Wheel (140) may scroll horizontally. Alternatively, Scroll Wheel (140) may scroll vertically, in a circular motion, or in any other direction. It will be apparent to one of ordinary skill in the art that the scrolling motion may be any motion and, as such, the invention should not be limited to the above examples. In one or more embodiments of the invention, Scroll Wheel (140) may be of any size and of any shape. It will be apparent to one of ordinary skill in the art that there are many sizes and shapes that Scroll Wheel (140) may be and, as such, the invention should not be limited to any particular size or shape.

In one or more embodiments of the invention, Scroll Wheel (140) is operated by a customer to input one or more digits of the customer's PIN for/during a card-based transaction. Specifically, the customer touches (e.g., presses, rubs, swipes with one or more fingers) Touch Sensitive Region (145) to rotate/operate the displayed and/or mechanical wheel and select the desired digit. In one or more embodiments of the invention, Touch Sensitive Region (145) may be located directly on the displayed wheel and/or mechanical wheel (e.g., Touch Sensitive Region (145) is part of the displayed wheel and/or mechanical wheel). In one or more embodiments of the invention, Touch Sensitive Region (145) is located adjacent to the displayed and/or mechanical wheel. Specifically, Touch Sensitive Region (145) is not the entire touch screen and/or mechanical wheel. Rather, Touch Sensitive Region (145) may correspond to only a portion of the touch screen and/or mechanical wheel that a user touches multiple times to enter his or her PIN. As multiple digits in the PIN may be selected by touching (e.g., pressing, rubbing, swiping with one or more fingers) the same Touch Sensitive Region (145), it is unlikely that the PIN will be compromised using the thin film method (discussed above) or any other PIN tracking fraud. In other words, even if a thin film was placed over Scroll Wheel (140), little would be determined from examining the thin film after the customer had entered his or her PIN and the PIN would not be compromised. This is in contrast to, for example, a keypad or number pad, where touching the number "1" always enters a "1."

In one or more embodiments of the invention, Payment Terminal (120) includes Financial Application (125), and is communicatively connected to Financial Institution (110), Card Reader (130), and Scroll Wheel (140). Although Card Reader (130) and/or Scroll Wheel (140) are shown in FIG. 1 as external to Payment Terminal (120), in one or more embodiments of the invention, Card Reader (130) and/or Scroll Wheel (140) are part of Payment Terminal (120) (i.e., internal components of Payment Terminal (120)). In such embodiments, Payment Terminal (120) may include a touch screen for displaying the Scroll Wheel (140). Payment Terminal (120) may be a server, mainframe, PC, laptop, PDA, telephone, smartphone, mobile phone, kiosk, cable box, and/or any other suitable device. In one or more embodiments of the invention, Payment Terminal (120) includes a cellular module (not shown) for executing wireless voice and/or data calls.

In one or more embodiments of the invention, Financial Application (125) is a software application executing on Payment Terminal (120). Alternatively, Financial Application (125) may be a thin client, and executing on a device separate from Payment Terminal (120). In one or more embodiments of the invention, Financial Application (125) is configured to receive a request for a card-based financial transaction between a customer and a merchant, prompt the customer for a PIN corresponding to the card, receive the PIN entered by the customer (e.g., using Scroll Wheel (140)), and complete the card-based transaction (e.g., using the card data item(s) from Card Reader (130)). Payment Terminal (120) may have a touch screen on which a software scroll wheel may be displayed, and through which users may interact with the scroll wheel. It will be apparent to one of ordinary skill in the art, having the benefit of this detailed description, that Financial Application (125) may have many functionalities and, as such, should not be limited to the above examples.

In one or more embodiments of the invention, Financial institution (110) may be a bank, credit union, government, brokerage firm, financial services provider, clearing house or any other type of institution that stores, deals with, or relates to finances and financial data. For example, Financial Institution (110) may be an acquiring bank in a credit card network. In one or more embodiments of the invention, Financial Institution (110) provides Payment Terminal (120) to the merchant. Card-based transactions involving the merchant are processed by the Financial Institution (110) and the Financial Institution (110) exchanges the necessary acknowledgements, approval codes, etc. with Payment Terminal (120).

Figure 2:
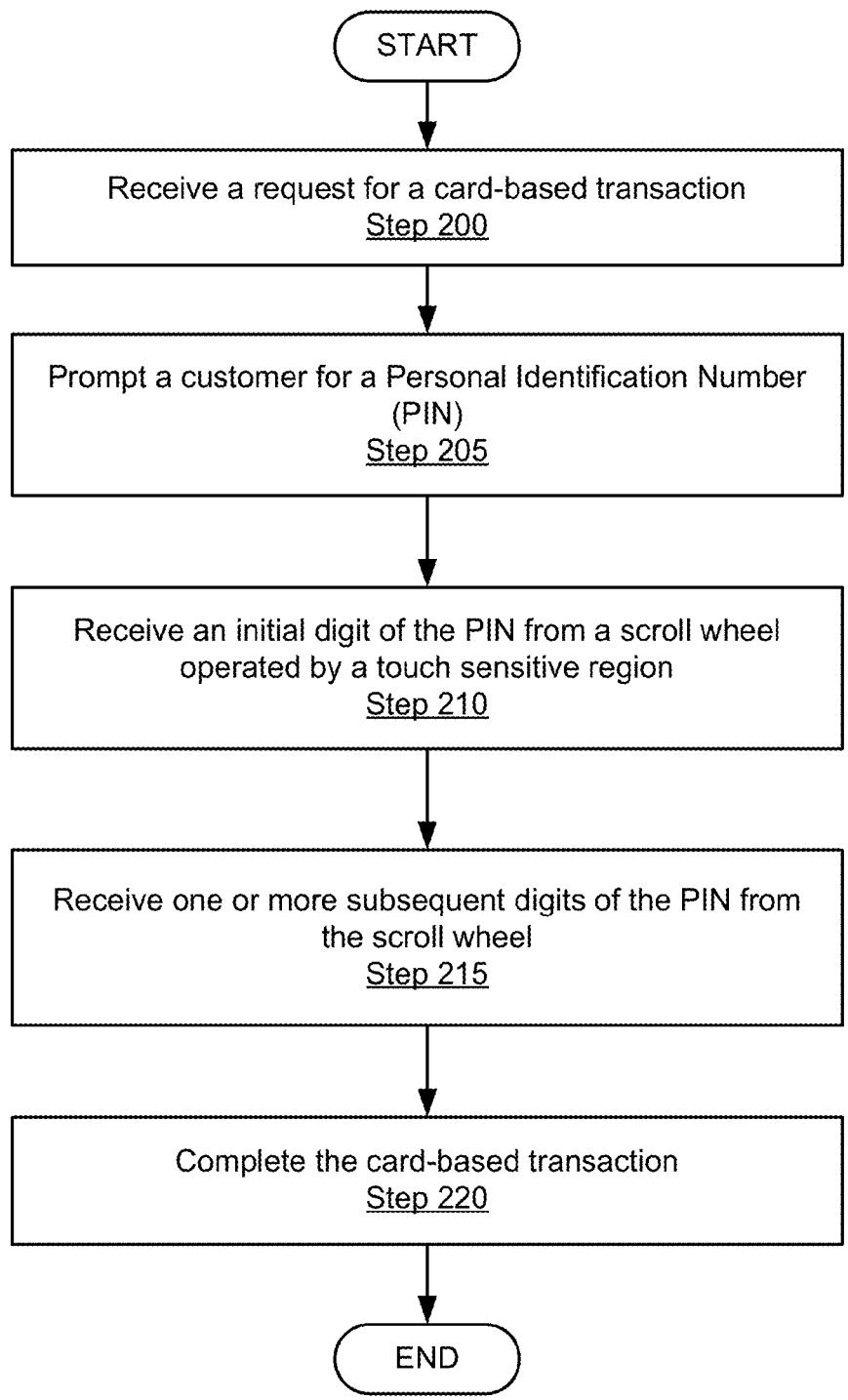
FIG. 2 shows a flowchart of a method in accordance with one or more embodiments of the invention.

FIG. 2 shows a flowchart of a method for PIN fraud prevention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a request is received for a card-based transaction, in accordance with one or more embodiments of the invention. In one or more embodiments of the invention, the request may be received from a card reader, as described above. The card reader may be external to the payment terminal, or it may be integrated into the payment terminal. It will be apparent to one of ordinary skill in the art that the request for a card-based transaction may be received in any manner and, as such, the invention should not be limited to the above examples.

In Step 205, a customer is prompted for a PIN, in accordance with one or more embodiments of the invention. In one or more embodiments of the invention, the customer may be prompted in any method now known or later developed. For example, text may be displayed on the payment terminal instructing the customer to enter his or her pin. As another example, a video or animation could be played asking the customer for his/or her PIN and explaining how to enter the PIN. It will be apparent to one of ordinary skill in the art that there are a variety of ways to ask for a PIN and, as such, the invention should not be limited to the above examples.

In Step 210, an initial digit of the PIN is received, in accordance with one or more embodiments of the invention. As described above, in one or more embodiments of the invention, the initial digit of the PIN may be received from a scroll wheel. Specifically, the customer rotates the scroll wheel until the desired initial digit is selected. In one or more embodiments of the invention, the customer touches a touch sensitive region associated with the scroll wheel to operate/rotate the scroll wheel and enter a digit of the PIN. The touch sensitive region may correspond to only a portion of the (i.e., not the entire) touch screen. By using a scroll wheel, many kinds of PIN based fraud may be prevented because the scroll wheel operates/rotates in response to the customer touching (e.g., pressing, rubbing, swiping with one or more fingers) the same touch sensitive region to enter multiple digits of their PIN. Thus, if the customer is tracked by any method (such as placing a film over the scroll wheel) while entering their PIN, their PIN is not compromised.

Further, as described above, the scroll wheel may be a software application executing on the payment terminal. In one or more embodiments of the invention, the payment terminal includes a touch screen. The scroll wheel and the touch sensitive region may both be displayed on the touch screen, thus allowing a user to enter their PIN by touching the touch sensitive region. Alternatively, the scroll wheel may be a mechanical device that is communicatively connected to the payment terminal. In one or more embodiments of the invention, the PIN may be entered a single character at a time, or may be entered all at once. A prolonged pause may signal the customer has finished entering the first digit and is ready to enter the second digit of the PIN. Alternatively, the user may force enter a digit by pressing a 'Next' or 'Enter' button, which may convert the displayed digit into a hidden character. It will be apparent to one of ordinary skill in the art that there are many ways to enter a PIN and, as such, the invention should not be limited to the above examples.

In Step 215, the subsequent digits of the PIN are received, in accordance with one or more embodiments of the invention. The subsequent digits of the PIN may be input/received in the same manner as described above. In one or more embodiments of the invention, the one or more subsequent digits of the PIN are different than the first digit, and the user touches the same touch sensitive region associated with the scroll wheel used to enter the first digit, thus preventing fraud.

In Step 220, the card-based transaction is completed, in accordance with one or more embodiments. In one or more embodiments of the invention, the card-based transaction may be denied if for example, the PIN is incorrect. Alternatively, the details of the card-based transaction may be sent to a financial institution if the PIN is correct. It will be apparent to one of ordinary skill in the art, having the benefit of this detailed description, that the card-based transaction may be completed in any method now known or later developed and, as such, the invention should not be limited to the above example.

The following section describes various examples of the invention. The examples are included to aid in the understanding of the invention and are not intended to limit the scope of the invention.

Figure 3A:
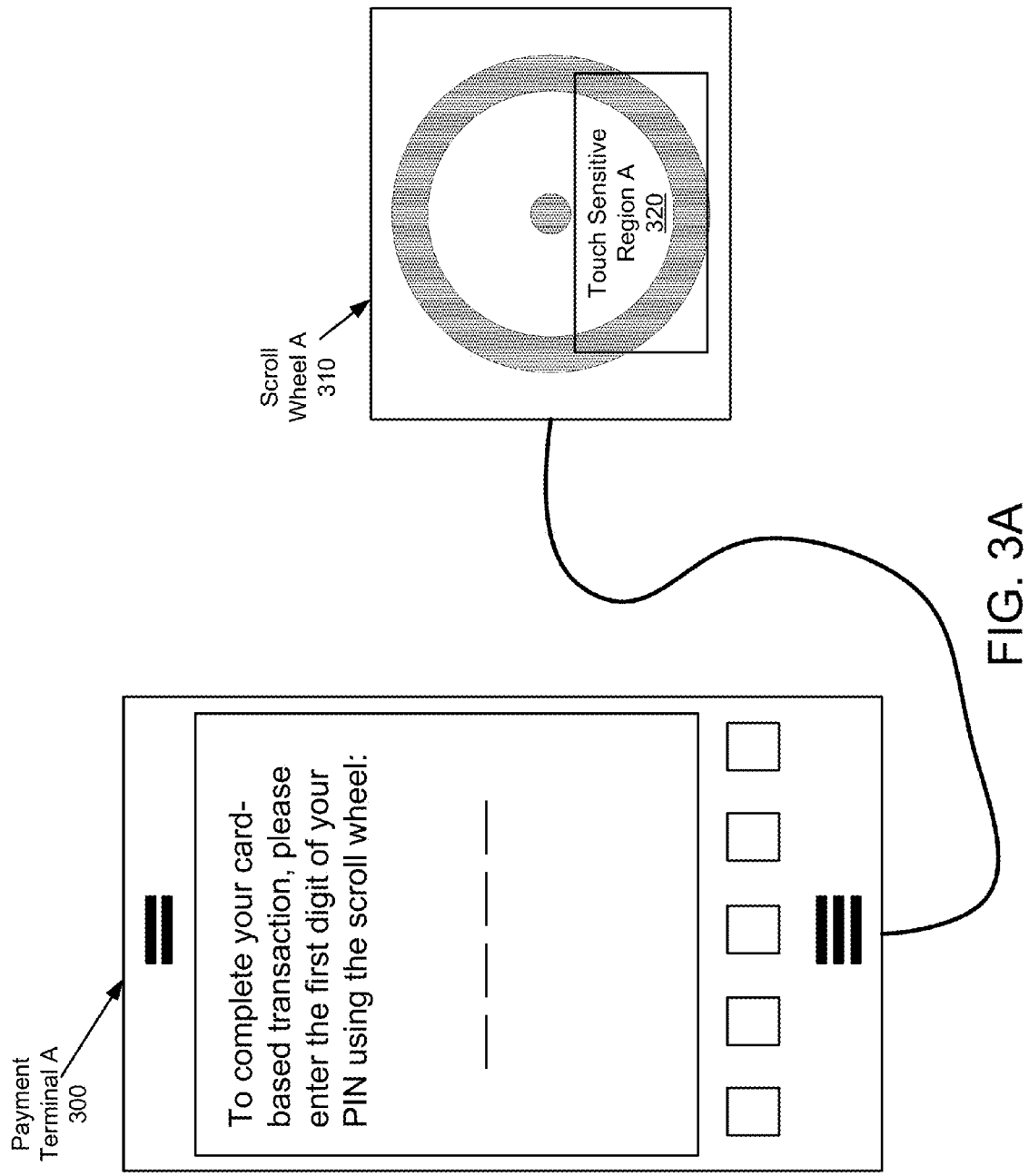
FIGS. 3A and 3B show examples in accordance with one or more embodiments of the invention.
Figure 3B:
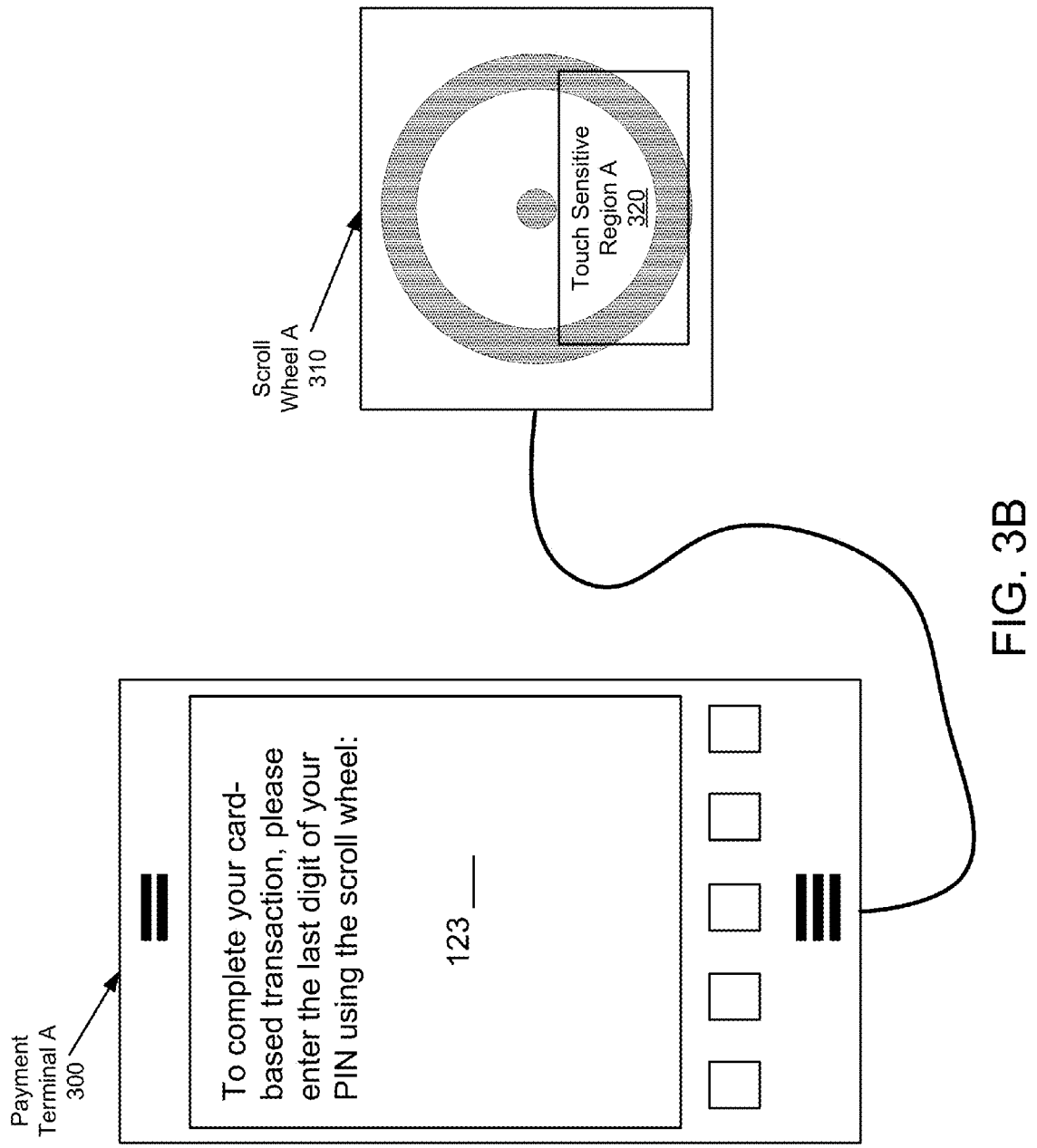

FIGS. 3A & 3B show an example of a user entering their PIN in accordance with one or more embodiments of the invention. In FIG. 3A, Payment Terminal A (300) is shown after a user has begun a card-based transaction. In this example, Payment Terminal A (300) is a smartphone or other similar device. In one or more embodiments of the invention, the card-based transaction may have been initiated by the user swiping his or her card through a card reader (not shown). Payment Terminal A (300) is displaying the message, "To complete your card-based transaction, please enter the first digit of your PIN using the scroll wheel." Scroll Wheel A (310) is communicatively connected to Payment Terminal A (300) and can be used to enter the customer's PIN. In this example, Scroll Wheel A (310) is an external device that is connected to Payment Terminal A (300) using a wired connection, although a wireless connection may also be used. Further, Scroll Wheel A (310) can, in one or more embodiments of the invention, be a software application executing on the payment terminal, as described previously.

Continuing with the example, the user touches Scroll Wheel A (310) to enter their PIN. Specifically, the user touches Touch Sensitive Region A (320) to enter the first digit of their PIN. Touch Sensitive Region A (320) is a subsection of Scroll Wheel A (310) through which the user is able to access all digits to enter their PIN, thus preventing fraud. In other words, Touch Sensitive Region A (320) is not the entire touch screen and/or mechanical wheel. In one or more embodiments of the invention, the user may swipe his or her finger across Touch Sensitive Region A (320) to access different digits when entering his or her PIN. It will be apparent to one of ordinary skill in the art that there are many ways to use a scroll wheel and, as such, the invention should not be limited to the above examples.

The example then proceeds to FIG. 3B, which depicts the same payment terminal and transaction as in FIG. 3A, but at a later point in time. Payment Terminal A (300) displays nearly the same text as in FIG. 3A, except that now the first three digits of the user's PIN have been entered. As described above, these three digits have been entered by touching Touch Sensitive Region A (320) on Scroll Wheel A (310) connected to the Payment Terminal A (300). In FIG. 3B, the user is being prompted by Payment Terminal A (300) to enter the last digit of the PIN using Scroll Wheel A (310). As described previously, the user will touch Touch Sensitive Region A (320) of Scroll Wheel A (310) to enter the last digit of their PIN.

After PIN entry has been completed, the payment terminal will complete the card-based transaction, by either authorizing or rejecting the transaction, based on any appropriate factors. It will be apparent to one of ordinary skill in the art that there are many ways to complete a card based transaction and, as such, the invention should not be limited to the above examples.

Figure 4:
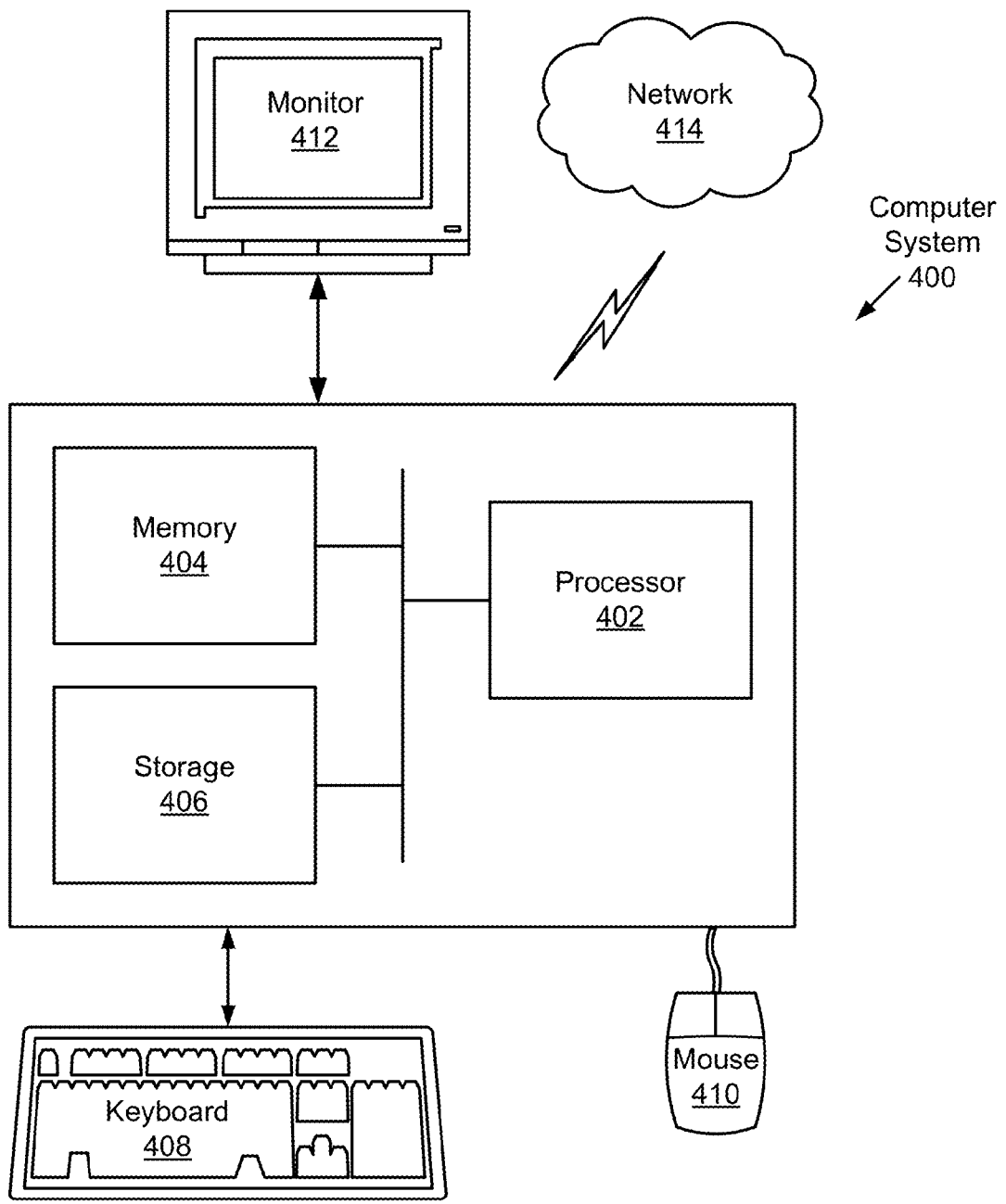
FIG. 4 shows a computer system in accordance with one or more embodiments of the invention.

Embodiments of the invention may be implemented on virtually any type of computer regardless of the platform being used. For example, as shown in FIG. 4, a Computer System (400) includes one or more Processor(s) (402) (such as a central processing unit (CPU), integrated circuit, hardware processor, etc.), associated Memory (404) (e.g., RAM, cache memory, flash memory, etc.), a Storage Device (406) (e.g., a hard disk, an optical drive such as a compact disk drive or digital video disk (DVD) drive, a flash memory stick, etc.), and numerous other elements and functionalities typical of today's computers (not shown). The Computer System (400) may also include input means, such as a Keyboard (408), a Mouse (410), or a microphone (not shown). Further, the Computer System (400) may include output means, such as a Monitor (412) (e.g., a liquid crystal display (LCD), a plasma display, or cathode ray tube (CRT) monitor). The Computer System (400) may be connected to a Network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the Computer System (400) includes at least the minimal processing, input, and/or output means necessary to practice embodiments of the invention.

Further, in one or more embodiments of the invention, one or more elements of the aforementioned Computer System (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for personal identification number (PIN) fraud prevention, comprising:
   receiving, by a payment terminal, a request for a card-based financial transaction;
   prompting, by the payment terminal, a customer for a PIN;
   receiving, by the payment terminal and from a scroll wheel corresponding to a plurality of digits, a first digit of the PIN,
   wherein the customer selects the first digit of the PIN by touching a touch sensitive region associated with the scroll wheel;
   receiving, by the payment terminal and from the scroll wheel, a second digit of the PIN,
   wherein the customer selects the second digit of the PIN by touching the touch sensitive region, and
   wherein touching the touch sensitive region to select the first digit and the second digit prevents fraud based on tracking PIN entry; and
   completing, by the payment terminal, the card-based financial transaction.

2. The method of claim 1, wherein the payment terminal comprises a touch screen, and wherein the scroll wheel and the touch sensitive region are displayed on the touch screen.

3. The method of claim 2, wherein the payment terminal is a smartphone.

4. The method of claim 1, wherein the scroll wheel is a mechanical device external to the payment terminal and operatively connected to the payment terminal.

5. The method of claim 1, wherein fraud based on tracking PIN entry comprises using a film to capture indents corresponding to the PIN.

6. The method of claim 1, wherein the plurality of digits are displayed on the scroll wheel.

7. The method of claim 1, further comprising:
   displaying the first digit on the payment terminal.

8. A non-transitory computer-readable medium (CRM) storing a plurality of instructions for personal identification number (PIN) fraud prevention, the plurality of instructions comprising functionality to:
   receive, using a payment terminal, a request for a card-based financial transaction;
   prompt, using the payment terminal, a customer for a PIN;
   receive, using the payment terminal and from a scroll wheel corresponding to a plurality of digits, a first digit of the PIN, wherein the customer selects the first digit of the PIN by touching a touch sensitive region associated with the scroll wheel;
   receive, using the payment terminal and from the scroll wheel, a second digit of the PIN,
   wherein the customer selects the second digit of the PIN by touching the touch sensitive region, and
   wherein touching the touch sensitive region to select the first digit and the second digit prevents fraud based on tracking PIN entry; and
   complete, using the payment terminal, the card-based financial transaction.

9. The non-transitory CRM of claim 8, wherein the payment terminal comprises a touch screen, and wherein the scroll wheel and the touch sensitive region are displayed on the touch screen.

10. The non-transitory CRM of claim 9, wherein the payment terminal is a smartphone.

11. The non-transitory CRM of claim 8, wherein the scroll wheel is a mechanical device external to the payment terminal and operatively connected to the payment terminal.

12. The non-transitory CRM of claim 8, wherein fraud based on tracking PIN entry comprises using a film to capture indents corresponding to the PIN.

13. The non-transitory CRM of claim 8, wherein the plurality of digits are displayed on the scroll wheel.

14. The non-transitory CRM of claim 8, the plurality of instructions further comprise functionality to:
displaying the first digit on the payment terminal.

15. A system for personal identification number (PIN) fraud prevention, comprising:
a scroll wheel corresponding to a plurality of digits;
a touch sensitive region used to select, based on touching by a customer, a first digit of a PIN and a second digit of the PIN from the plurality of digits,
wherein the PIN corresponds to an authorization code for the card of the customer, and
wherein touching the touch sensitive region to select the first digit and the second digit prevents fraud based on tracking PIN entry;
a processor; and
a financial application executing on the processor, operatively connected to the scroll wheel, and configured to:
receive a request for a card-based financial transaction;
prompt the customer for the PIN;
receive the PIN; and
complete the card-based financial transaction.

16. The system of claim 15, wherein the system further comprises:
a touch screen displaying the scroll wheel and the touch sensitive region.

17. The system of claim 16, further comprising:
a cellular module executing on the processor and configured to execute wireless voice calls.

18. The system of claim 15, wherein the scroll wheel is an external mechanical device.

19. The system of claim 15, wherein fraud based on tracking PIN entry comprises using a film to capture indents.

20. The system of claim 15, wherein the plurality of digits are displayed on the scroll wheel.

* * * * *